United States Patent

Ryrfors et al.

[11] 4,234,467
[45] Nov. 18, 1980

[54] BINDER FOR PRESSURE SENSITIVE ADHESIVE

[75] Inventors: Lars-Olof Ryrfors, Perstorp; Mats S. O. Hassander, Lund, both of Sweden

[73] Assignee: Hoechst-Perstorp AB, Perstorp, Sweden

[21] Appl. No.: 14,085

[22] Filed: Feb. 22, 1979

[30] Foreign Application Priority Data

Mar. 3, 1978 [SE] Sweden ................ 7802418

[51] Int. Cl.³ .................................... C08L 33/02
[52] U.S. Cl. ........................ 260/29.7 H; 526/317; 526/87
[58] Field of Search ............ 260/29.6 TA, 29.7 H, 260/29.7 T; 526/317, 323.1, 323.2

[56] References Cited

U.S. PATENT DOCUMENTS

| | | | |
|---|---|---|---|
| 3,971,766 | 7/1976 | Ono | 526/323.2 |
| 3,983,297 | 9/1976 | Ono | 428/355 |
| 3,988,274 | 10/1976 | Masuhara | 260/29.7 H |
| 3,998,997 | 12/1976 | Mowdood | 526/271 |
| 4,143,017 | 3/1979 | Tarumi | 526/317 |

FOREIGN PATENT DOCUMENTS

1423633 2/1976 United Kingdom .

*Primary Examiner*—Paul R. Michl
*Attorney, Agent, or Firm*—Stevens, Davis, Miller & Mosher

[57] ABSTRACT

Binder for a pressure sensitive adhesive, characterized in that it exists as a polymer dispersed in water and obtained by emulsion polymerization of:

(A) 65.0–99.4 percent by weight of one or more acrylic esters with 4–18, preferably 6–10 carbon atoms in the alcohol part of the ester, the esters being selected in such a way that a polymerization of only these esters gives a tacky polymer with a Tg-value below 0° C., preferably below −20° C.

(B) 2.0–0.1 percent by weight of a polymerizable compound with the formula

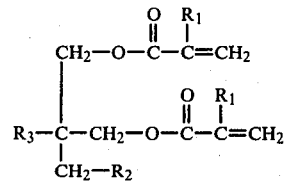

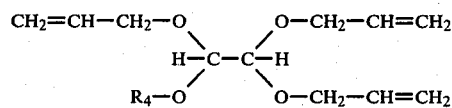

or with the formula wherein $R_1$, $R_2$, $R_3$ and $R_4$ are as defined in the specification (C) 5.0–0.5 percent by weight of at least one ethylenically unsaturated acid such as acrylic acid, methacrylic acid or itaconic acid and (D) 28.0–0 percent by weight of one or more compounds selected from the group consisting of alkyl- or hydroxyalkyl acrylate or a lower alkyl or hydroxyalkyl methacrylate with 1–3 carbon atoms in the alcohol part of the ester, acrylonitrile or styrene.

5 Claims, No Drawings

BINDER FOR PRESSURE SENSITIVE ADHESIVE

BINDER FOR A PRESSURE SENSITIVE ADHESIVE

The present invention relates to a binder for a pressure sensitive adhesive and a process for the production of said binder.

Today, so called pressure sensitive adhesive is mainly used for gluing of diffusion tight materials, such as PVC-carpets and PVC-wallpapers. Then the adhesive is applied to the underlayer, whereupon the volatile components, usually water, of the adhesive are evaporated before the diffusion tight material is applied to the adhesive.

The reason for not using wet-gluing is that the volatile components of the adhesive would be enclosed between the underlayer and the diffusion tight surface covering, whereby the glue line would be too weak.

A pressure sensitive adhesive must be tacky when the main part of the volatile components has evaporated, in order to work in a satisfactory way. As a rule, it is desirable that the adhesive layer will be tacky for at least 3 hours, preferably a whole working-day.

The pressure sensitive adhesive should also have a high cold flow resistance.

It is a very difficult problem to produce a pressure sensitive adhesive which is tacky enough and at the same time has got a high cold flow resistance.

According to the present invention one has been able to solve the above mentioned problem and brought about a binder for a pressure sensitive adhesive. The binder is characterized in that it exists as a polymer dispersed in water and obtained by emulsion polymerization of:

(A) 65.0-99.4 percent by weight of one or more acrylic esters with 4-18, preferably 6-10 carbon atoms in the alcohol part of the ester, the esters being selected in such a way that a polymerization of only these esters gives a tacky polymer with a Tg-value below 0° C., preferably below −20° C.

(B) 2.0-0.1 percent by weight of a polymerizable compound with the formula

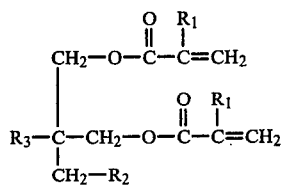

where $R_1 = H$ or $CH_3$
$R_2 = H$ or

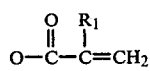

and $R_3 = CH_3$, $C_2H_5$, OH or

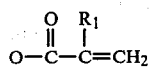

or with the formula

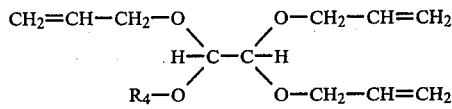

where $R_4 = CH_3$ or $CH_2CH=CH_2$ (C) 5.0-0.5 percent by weight of at least one ethylenically unsaturated acid, such as acrylic acid, methacrylic acid or itaconic acid and (D) 28.0-0 percent by weight of one or more compounds from the group consisting of alkyl- or hydroxyalkyl acrylate or lower alkyl or hydroxyalkyl methacrylate with 1-3 carbon atoms in the alcohol part of the ester, acrylonitrile and styrene.

With "Tg-value" we mean the glass transformation temperature for the polymer. The Tg-value can easily be calculated by starting from the Tg-values for the separate homopolymers. These values are mentioned in the specialist literature.

Preferably, the dispersed polymer is obtained by emulsion polymerization of:
78.0-98.9 percent by weight of one or more of the compounds from group (A)
1.0-0.1 percent by weight of one or more compounds from group (B)
3.0-1.0 percent by weight of at least one compound from group (C) and
18.0-0 percent by weight of one or more compounds from group (D).

Among the acrylic esters with 4-18 carbon atoms in the alcohol part of the ester, especially ethyl acrylate, butyl acrylate, hexyl acrylate, octyl acrylate in different isomeric forms, preferably ethylhexyl acrylate and isoctyl acrylate, lauryl acrylate, stearyl acrylate, ethylhyxyl methacrylate and dodecyl methacrylate can be mentioned.

Monomers from group (D) are not compulsory.

The purpose of these monomers is to modify the Tg-value, the tackiness, the elasticity etc. of the polymer.

According to the invention, a polymer being especially suitable can be brought about by emulsion polymerization of:

(A) one or more of the compounds ethylhexyl acrylate, butyl acrylate and ethyl acrylate (B) one or more of the compounds trimethylol propane triacrylate (TMPTA), trimethylol propane trimethacrylate (TMPTMA), pentaerythritol triacrylate (PETA) and tetraallyl ethane (TAE)

(C) at least one of the compounds acrylic acid and methacrylic acid and (D) possibly one or more of the compounds acrylonitrile, methyl acrylate, methyl methacrylate and styrene.

The binder according to the invention is produced by emulsion polymerization of the compounds from the groups (A), (B), (C) and (D) in water at a temperature of about 40°-90° C. Then the compounds from the groups (A), (C) and (D) are first copolymerized for ¼ to ⅞ of the total reaction time, whereupon the compounds from the group (B) are added and the reaction is finished.

Suitably, the compounds from the groups (A), (C) and (D) are first copolymerized for ½ to 4/5 of the total reaction time, whereupon the compounds from the group (B) are added and the reaction is finished.

Often the total reaction time at this kind of polymerization is about 4 hours. However, it is of no importance for the process according to the invention if the total reaction time is shorter or longer than 4 hours. The decisive thing is that the compounds from the group (B) are not added from the beginning of the polymerization. Then a polymer which is not tacky enough is namely obtained, since the cross-linking of the polymer has gone too far.

The emulsion polymerization can be carried out either continuously or step by step.

At the polymerization one can use nonion active and/or anion active emulsifiers of known type. Nonylphenol polyglycol ether and sodium laurylsulphate are examples of two suitable emulsifiers. The first mentioned compound is nonion active and the other compound is anion active. There are many other examples of suitable emulsifiers mentioned in the literature. Therefore, it is not necessary to specify them here.

The invention will be explained more in detail in connection with the embodiment examples below, which show a polymerization of different monomer mixtures. Then, the Examples 1, 4, 5, 6, 7, 8, 9 and 10 relate to a process according to the invention. The Examples 2 and 3 are comparative examples. Thus, according to Example 2 no compound from group (B) was used and according to Example 3 the compound from group (B) was added from the beginning of the polymerization.

EXAMPLE 1

200 g of water was charged into a two liter, three-necked reaction bulb of glass provided with a stirrer, a cooler and a thermometer.

In a separate bulb a monomer mixture containing 790 g of 2-ethylhexyl acrylate, 18 g of acrylic acid, 90 g of acrylonitrile, 280 g of water, 2 g of sodium laurylsulphate and 27 g of nonylphenol polyglycol ether with about 30 ethylene oxide units was prepared.

The mixture was divided into two parts, a first one consisting of 75% of the mixture and a second one consisting of 25% of the mixture. 2.25 g of trimethylol propane triacrylate (TMPTA) was added to this second part containing 25% of the mixture.

The polymerization was started by heating the reaction bulb to 82° C. Thereafter, a continuous addition of the first part of the monomer mixture to the reaction bulb was started. The addition time for this first monomer mixture was 3 hours. Thereafter, the second part of the monomer mixture was continuously added for one hour at the same temperature. A solution of 2.5 g of ammonium persulphate in 100 g water was continuously charged into the reaction bulb at the addition of the first part as well as the second part of the monomer mixture. Finally, the polymer dispersion obtained was cooled to room temperature.

EXAMPLE 2

The process according to Example 1 was repeated with the exception that the monomer mixture was not divided into two parts and that no addition of TMPTA was made.

EXAMPLE 3

The process according to Example 1 was repeated with the exception that the monomer mixture was not divided into two parts and that the addition of TMPTA was made to the whole monomer mixture.

EXAMPLE 4

The process according to Example 1 was repeated with the exception that the amount of TMPTA was increased to 4.5 g.

EXAMPLE 5

The process according to Example 1 was repeated with the exception that pentaerythritol triacrylate (PETA) was added instead of TMPTA.

EXAMPLE 6

The process according to Example 5 was repeated with the exception that the amount of PETA was increased to 4.5 g.

EXAMPLE 7

The process according to Example 5 was repeated with the exception that the monomer mixture was divided into two parts of the same size and that the addition of PETA was made to part 2.

EXAMPLE 8

The process according to Example 5 was repeated with the exception that the monomer mixture was divided into two parts. The first part made 80% and the second part made 20% of the monomer mixture. The addition of PETA was made to part 2.

EXAMPLE 9

The process according to Example 1 was repeated with the exception that trimethylol propane trimethacrylate (TMPTMA) was added instead of TMPTA.

EXAMPLE 10

The process according to Example 1 was repeated with the exception that tetraallyl ethane (TAE) was added instead of TMPTA.

The dispersions produced according to Examples 1–10 were used for the production of an adhesive according to the recipe below:

| | |
|---|---|
| Dispersion (60 percent dry content) | 300 g |
| Filler (for example terra alba) | 150 g |
| Resin solution (for example colophony in toluene) | 50 g |
| Dispersion agent (for example 10 percent sodium hexametaphosphate) | 1.5 g |
| Thickening agent (for example hydroxyethyl cellulose) | 0.5–1.5 g |

The cold flow resistance of the adhesives thus produced was measured by application of about 250 g of adhesive per m$^2$ of a concrete plate by means of a toothed putty. Immediately respectively 3 hours after the application of the adhesive samples of a homogeneous PVC-carpet were firmly rubbed against the concrete plate by means of a 5 kg heavy roll which was slowly rolled four times over the carpet. The surface of the glue line was 10×3 cm (=30 cm$^2$) and 3 samples were used.

The samples were conditioned in a constant room for four days. Thereafter, the concrete plate was fixed in a vertical position in a test stand, whereupon the samples were loaded with a weight of 2 kg for four days. Then the weight was increased by 2 kg to 4 kg totally, which weight was kept for four days. Thereafter, the weight was increased to 6 kg. The time lapsed until the samples fell down was observed. That time was a measure of the cold flow resistance of the adhesive.

The result of the different experiments is shown in the table below. The dispersion used in the adhesive recipe is indicated in the first column of the table. In the second column the expression "open time" means the time between the application of the adhesive on the concrete plate and the application of the PVC-carpet. The number of days lapsed until the samples fell down from the concrete plate is indicated in the third column of the table.

TABLE

| Dispersion from Example No. | Open time, hours | Number of days |
|---|---|---|
| 1 | 0 | >12 |
| 1 | 3 | 10–12 |
| 2 | 0 | 4 |
| 2 | 3 | 3–4 |
| 3 | 0 | >12 |
| 3 | 3 | 1 |
| 4 | 0 | >12 |
| 4 | 3 | 8 |
| 5 | 0 | >12 |
| 5 | 3 | 10 |
| 6 | 0 | >12 |
| 6 | 3 | 9 |
| 7 | 0 | >12 |
| 7 | 3 | 11 |
| 8 | 0 | >12 |
| 8 | 3 | 10 |
| 9 | 0 | >12 |
| 9 | 3 | 12 |
| 10 | 0 | >12 |
| 10 | 3 | 10 |

As shown in the table, a very low cold flow resistance was obtained at an open time of 0 as well as 3 hours at the use of an adhesive containing a dispersion produced according to Example 2. As mentioned before, the dispersion produced according to Example 2 did not contain any compound from group (B) above. Therefore, the cold flow qualities became so bad.

The table also shows that a dispersion produced according to Example 3 gave a good cold flow resistance at an open time of 0 hours. However, the cold flow resistance at an open time of 3 hours became very low owing to the fact that the compound (in this case TMPTA) from group (B) was added from the beginning of the polymerization, not when the polymerization had proceeded for a certain time. By this polymerization process a very crosslinked polymer was obtained. The tackiness of the polymer did not last for 3 hours.

As evident from the table, the polymer dispersions produced according to the invention (Examples 1, 4, 5, 6, 7, 8, 9 and 10) gave very good cold flow properties at an open time of 0 hours as well as 3 hours.

The invention is not limited to the embodiment examples shown, as these can be modified in different ways within the scope of the present invention.

We claim:

1. Process for the production of a binder for a pressure sensitive adhesive by emulsion polymerization of:
   (A) 65–99.4 percent by weight of at least one acrylic ester with 4–18 carbon atoms in the alcohol part of the ester, the esters being selected whereby polymerization of only the selected esters produces a tacky polymer with a Tg-value below 0° C.;
   (B) 0.1 to 2 percent by weight of a polymerizable compound selected from the group consisting of a compound of the formula

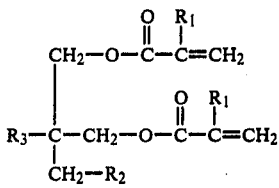

where $R_1 =$ H or $CH_3$,
$R_2 =$ H or

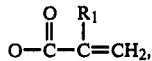

and
$R_3 = CH_3$, $C_2H_5$, OH, $CH_2OH$ or

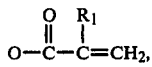

or a compound with the formula

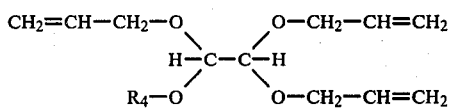

where $R_4 = CH_3$ or $CH_2CH=CH_2$ (C) 5–0.5 percent by weight of at least one ethylenically unsaturated acid
and
   (D) 28–0 percent by weight of one or more compounds selected from the group consisting of an alkyl acrylate, a hydroxyalkyl acrylate, a lower alkyl methacrylate, a hydroxyalkyl methacrylate with 1–3 carbon atoms in the alcohol part of the ester, acrylonitrile or styrene, said process comprising first copolymerizing the compounds from the groups (A), (C) and (D) in water at a temperature of about 40°–90° C. for ¼ to ⅞ of the total reaction time, and then mixing therewith a compound from group (B) and completing the reaction.

2. The process of claim 1 wherein the compounds from the groups (A), (C) and (D) are first copolymerized for ½ to 4/5 of the total reaction time, the compounds from group (B) are mixed therewith, and the reaction is completed.

3. The process of claim 1 or 2 wherein the total reaction time is about 4 hours.

4. The process of claim 1 or 2 wherein 78–98.9 percent by weight of one or more compounds from group (A), 1–0.1 percent by weight of one or more compounds from group (B), 3–1 percent by weight of at least one compound from group (C) and 18–0 percent by weight of one or more compounds from group (D) are copolymerized.

5. The process of claim 1 or 2 wherein A is ethylhexyl acrylate, butyl acrylate, ethyl acrylate or a mixture thereof,
   B is trimethylol propane triacrylate, trimethylol propane trimethacrylate, pentaerythritol triacrylate, tetraallyloxy ethane or a mixture thereof,
   C is at least one of the compounds acrylic acid or methacrylic acid, and
   D is acrylonitrile, methyl acrylate, methyl methacrylate or styrene.

* * * * *